(No Model.) 4 Sheets—Sheet 1.
H. HILL & A. L. ADAMS.
MAGAZINE CAMERA.
No. 555,865. Patented Mar. 3, 1896.
FIG:1.
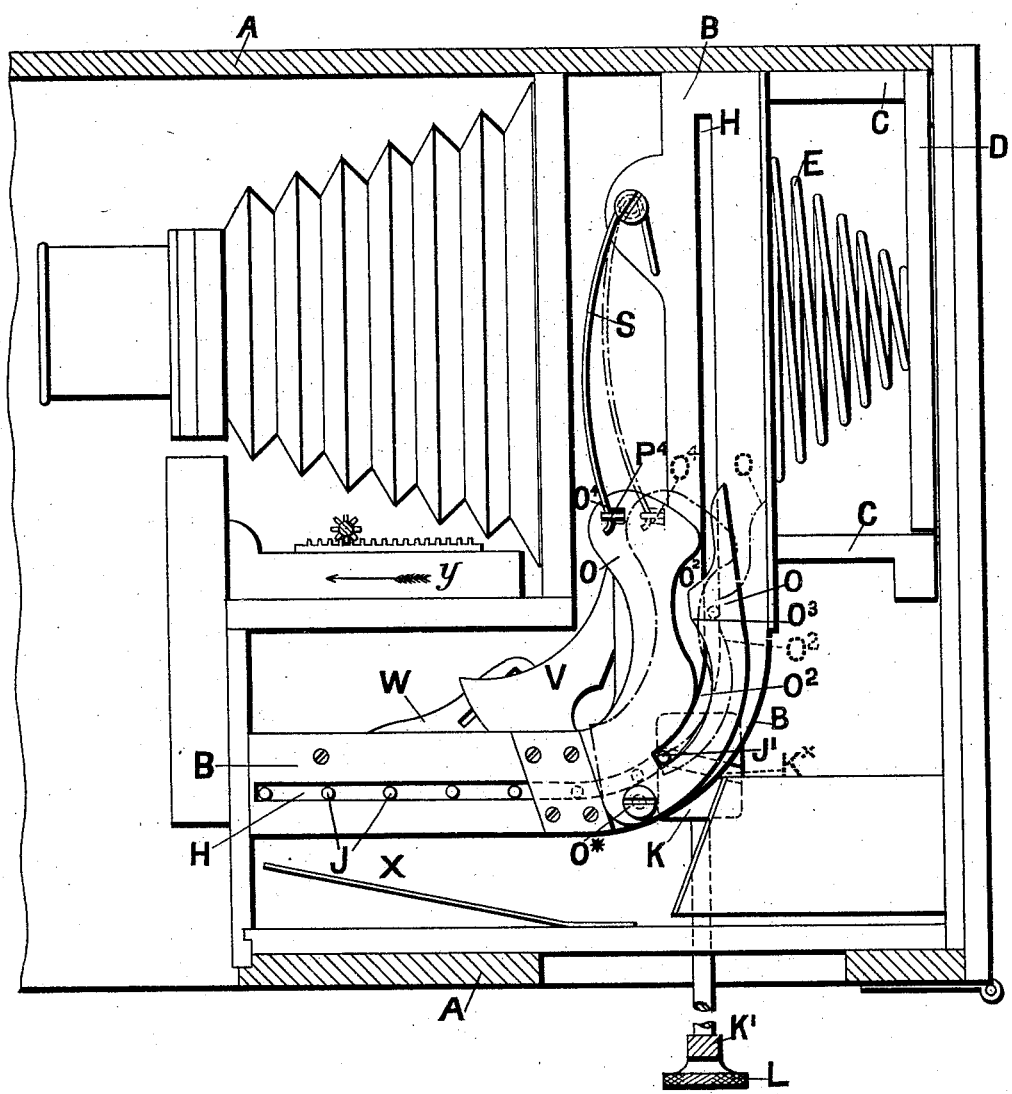
WITNESSES
INVENTORS
Henry Hill +
Arthur L. Adams,
by Whitman & Wilkinson,
Attys

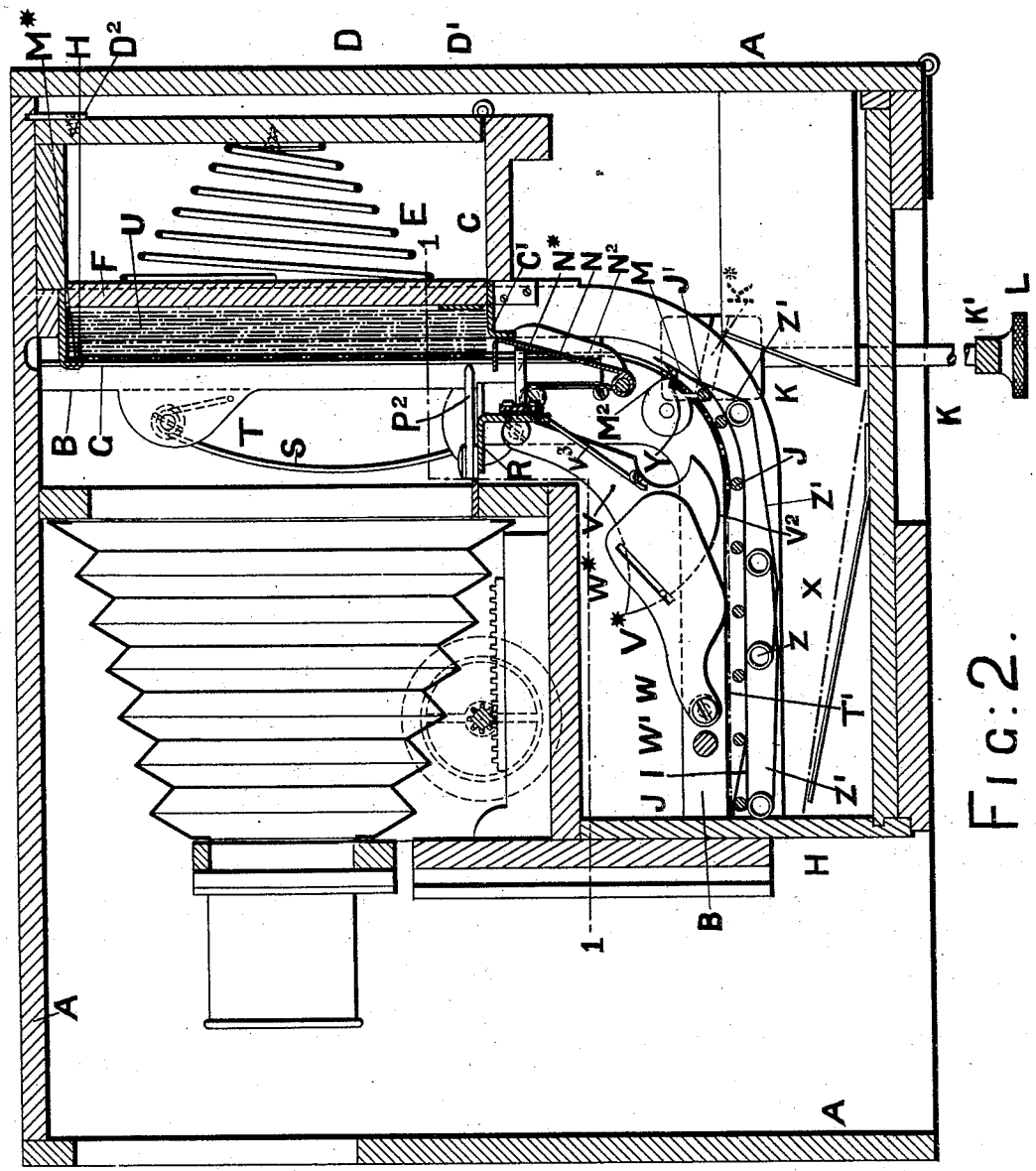

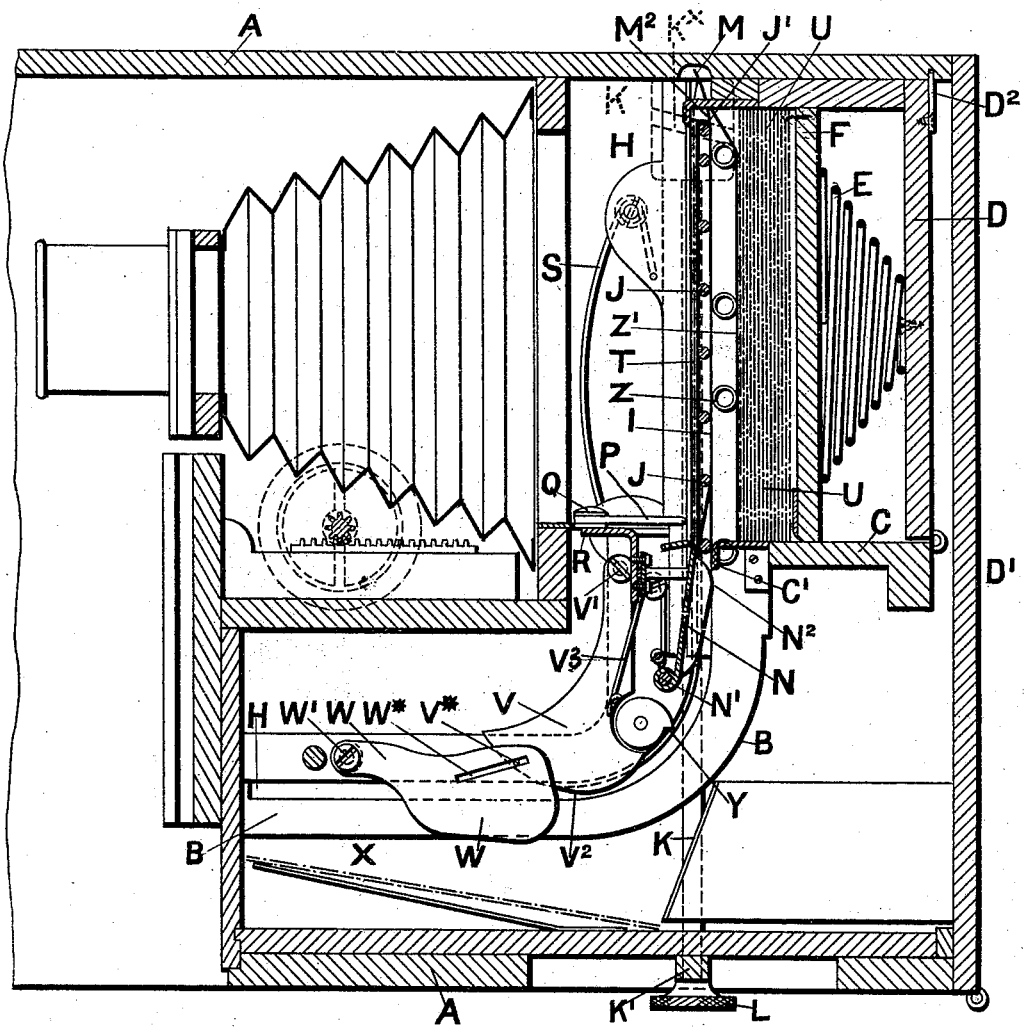

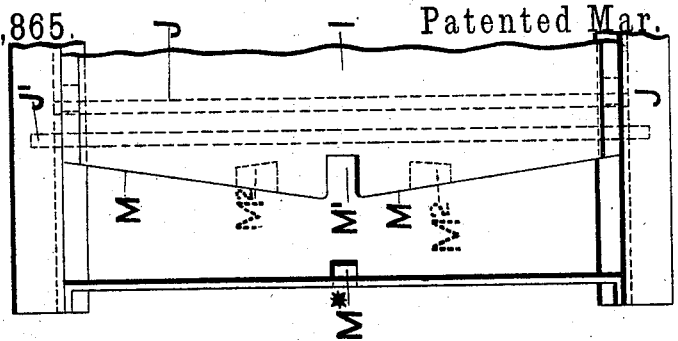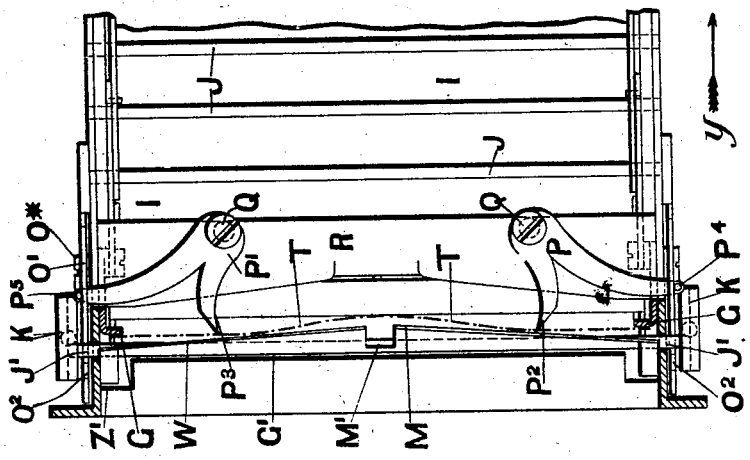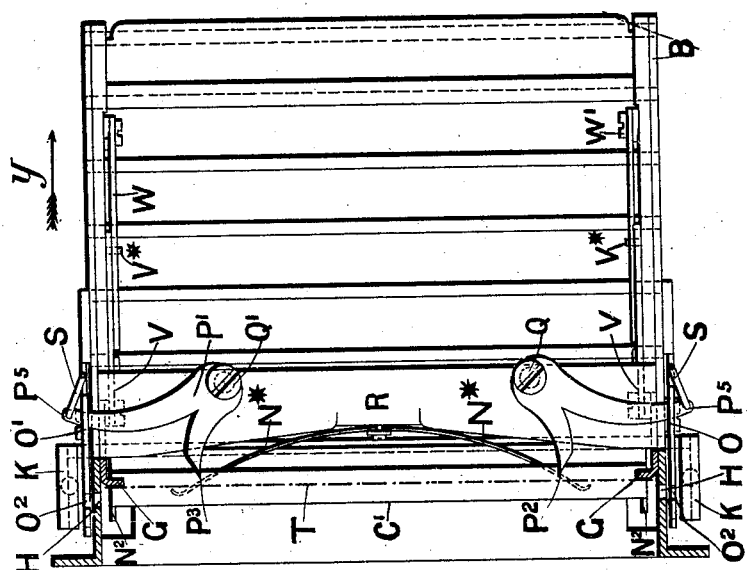

UNITED STATES PATENT OFFICE.

HENRY HILL AND ARTHUR LEWIS ADAMS, OF LONDON, ENGLAND.

MAGAZINE-CAMERA.

SPECIFICATION forming part of Letters Patent No. 555,865, dated March 3, 1896.

Application filed August 15, 1894. Serial No. 520,386. (No model.) Patented in England June 12, 1894, No. 11,387.

*To all whom it may concern:*

Be it known that we, HENRY HILL, of 151 Fentiman Road, Clapham, London, S.W., and ARTHUR LEWIS ADAMS, of 81 Aldersgate Street, London, England, subjects of the Queen of Great Britain, have invented a new or Improved Method and Means of Exposing and Changing Flexible Sensitive Surfaces Used as a Pack in Photographic Cameras, (for which we have obtained Letters Patent in Great Britain, No. 11,387, dated June 12, 1894,) of which the following is a specification.

Our present invention is designed for the purpose of enabling films (and by the term "films" we intend to include any suitable flexible sensitive surface for receiving photographic impressions) to be used unaltered—*i. e.*, so that such films just as same come from the manufacturer can be placed in a suitable compartment in the photographic apparatus without interposing any material whatsoever between each of the films, these being consequently all laid together in a pack in said chamber, which latter corresponds in size and shape with the size and shape of the films and may be of sufficient depth from back to front to hold, say, fifty or one hundred (or more or less) of said films, as desired.

According to our present invention we select and separate the front film from the rest of the pack without removing said film from its said front position and at the same time prevent any light from penetrating beyond the actual front film during the exposure thereof and thereafter remove said front film into another chamber—*i. e.*, the storage-chamber—and thereby allow the next succeeding film to automatically come up to register and so on in succession all through the pack, and for this purpose we proceed as follows, our invention being fully described with reference to the accompanying drawings, in which—

Figure 1 is a side view of our camera having the side wall removed to show our present improvements. Fig. 2 is a longitudinal section showing the sliding light-tight back or "carriage" down—*i. e.*, clear of the pack of films. Fig. 3 is a similar view to Fig. 2, showing the carriage up—*i. e.*, in position forming a temporary backing to the front film T—and showing the rest of the pack forced back thereby. Fig. 4 is a horizontal sectional view on line 1 1, Fig. 2, showing the normal position of the stabbing device clear of the front film T. Fig. 5 is a similar view to Fig. 4, showing the front film T impaled on the stabbing devices and bulged thereby in the middle so as to permit the insertion of the nose of the slide between same and the rest of the pack. Fig. 6 is a local view in elevation of the nose or top part of the carriage just before same reaches its highest position, shown in Fig. 3.

Similar letters of reference indicate corresponding parts throughout.

A is the camera-case.

B is the removable frame carrying the film-changing mechanism so that the whole of same may be readily removed from the camera-case A for inspection or other purpose.

C is the reservoir or chamber carried on the frame B, into which a number of the films are placed, say fifty or one hundred, (or more or less,) the limitation of this number depending on the depth of this chamber C.

D is a cover suitably hinged to the back end of this chamber by hinges D', and secured when closed by the turn-buttons D² (see Fig. 2) or in any other suitable manner.

E, Fig. 2, is a spring compressed between the cover D and a plate F, by which means the whole pack or series of films in the chamber C are pressed forward so that the front film thereof is brought up to register against the vertical side cheeks or rabbet G down each side of the front of the chamber C, (see Figs. 2, 4 and 5,) and the bottom of the chamber C does not extend up to the point G, but terminates at the edge C'', so that sufficient room is left for the front film to be drawn down after exposure, as hereinafter explained.

H is a guideway down each side, which, commencing near the top of the chamber C, descends vertically and parallelly with the aforesaid rabbets G until below the bottom of the chamber C. This guideway H then extends in any direction desired. For instance, it may be curved and extend forwardly toward the lens end of the camera. (See Figs. 1, 2 and 3.) In these guideways H travels and is guided the flexible carriage or sliding light-tight backing and film-removing device, and this carriage consists of a suitable flexible light-tight material I, such as German silver, mounted on a series of rigid laths or stretcher-bars J, the extreme ends of which latter are guided in or on said guideways H, so that this carriage is such that it cannot fold or collapse, although flexible, so as to be capable of traveling around a curve in the guideways H, as shown in Figs. 1, 2 and 3.

J' is one of the laths J made longer than the rest, so as to project each side on the exterior of the guideways H, and these projecting ends of J' pass through a rocking lever on each side and terminate in a diagonal slot $K^\times$ (shown in dotted lines) in the draw-lever K on each side of said frame B, these draw-levers terminating at the bottom in a cross-bar K' with knob or handle L thereon, so that the said draw-levers K are operated simultaneously whenever the knob L is pulled out or pushed in, such movement thereby moving the cross-bar J in a corresponding degree down or up the guideways H, and this cross-bar J' moves the carriage formed by I J from one end to the other of said guideways H.

The carriage I J terminates in a bent-over tongue M (see Figs. 2 and 5) projecting at the central part of said carriage (which is slotted at M' to clear the retaining-catch $M^\times$ at the top of the reservoir-chamber C, which catch or stop $M^\times$ controls the top edge of the pack of films) and having lips or projections $M^2$ on the under side of said bent-over edge M to overlap and draw down the front film T in said carriage, as hereinafter explained.

N is a flap pivoted at N' and pushed forward by a spring $N^\times$, so as to normally lie across the path of travel of said carriage, and which is pushed out of the path of the said carriage by the latter striking the curved projecting side edges $N^2$ when the said carriage is moved into position in front of the reservoir C, the object of this flap N being to prevent light from penetrating to the chamber in which the films are deposited by the carriage after exposure, as hereinafter explained.

O is an oscillating cam-plate pivoted at $O^\times$ to the frame B and having a curved slot or camway $O^2$ therein, in which camway operates one of the projecting ends J' aforesaid.

O' (see Figs. 4 and 5) is a precisely similar cam-plate mounted on the opposite side of the frame B and operating in identically the same manner as the cam-plate O.

P P' are the two stabbing devices respectively pivoted at Q Q' on the platform or support R extending right across from side to side of the frame B. These appliances P P' for pricking or stabbing into the front film respectively consist of a sort of bell-crank device, one arm of each of which respectively terminates in the sharp point $P^2$ $P^3$, and the end $P^4$ of the other arm of P extends through a slot $O^4$ in the said oscillating cam-plate O, (see Fig. 1,) while the end $P^5$ of the other arm of the crank P' extends through a similar slot in the corresponding oscillating cam-plate O' on the opposite side.

S is a spring which normally keeps the end $P^4$ of the device P pressed in the direction of the arrow $y$, (see Figs. 1, 4 and 5,) and a similar spring to S (not shown) keeps the arm $P^5$ of the other device P' similarly pressed back. Thus both points, $P^2$ and $P^3$, are normally kept pressed back out of contact with and clear of the front film of the pack, this normal position being shown in Fig. 4.

T is the front film of the pack or series of films U.

Each side of the camera and inside the frame B is mounted a flap-plate V pivoted at V', and the curved part $V^2$ of which lies across the guideways H, across which it is normally pressed down by the spring $V^3$, so that the curved part $V^2$ of the plate V is struck by the ribs J as the carriage comes down and so throws up these pivoted plates V from the position shown in Fig. 3 to the position shown in Fig. 2.

A pin or stud $V^\times$ on the free end of this plate operates in a slot $W^\times$ in a second plate W pivoted at W', so that this latter plate is controlled by the former and thereby thrown up to the position shown in Fig. 2 out of the path of the carriage, while on the return of the carriage out of the storage-chamber X into the position shown in Fig. 3 the plate W is released and is forced down by the spring $V^3$ and lever-plate V into the storage-chamber X, as shown in Fig. 3, and these plates W on the opposite sides thus serve to keep down the loose films in said chamber from getting in the way of the carriage as same passes into and out of said storage-chamber X.

Y is a nose or projection on each side inside the frame B, against which the edge of the drawn-down film T' (see Fig. 2) strikes, and is thereby stripped out of the carriage on the return of the latter out of the storage-chamber X.

Z Z are supports fixed on the back of the carriage and having fixed thereto narrow strips of spring metal or equivalent Z' down each side edge of the carriage, and these serve to force back the rest of the pack of films U and prevent the carriage touching same except along each said side edge.

The operation is as follows: The whole of the films forming the pack U in the chamber C lie closely pressed against one another by the spring E up against the rabbets G, as in Fig. 2, the carriage being in the lowermost position clear of said chamber C, as shown in Figs. 1 and 2. To separate the front film the draw-levers K K are by means of the knob L and cross-bar K' pushed into the camera from the position shown in dotted lines in Figs. 1 and 2 until the top of each such draw-lever K arrives at a point above the top of the guideways H or thereabout. (See Fig. 3.) Immediately this movement of the levers K in the inward direction commences the same carry with them the projecting ends J' of the carriage, which carriage is consequently correspondingly moved along the guideway H, and said projections J' first ride up against the side $O^3$ of the camway $O^2$ (see Fig. 1) in the said oscillating side cam-plates O O', which latter are consequently forced in the opposite direction to the arrow $y$, and thereby the ends $P^4$ $P^5$ of the respective stabbing devices are moved in the same direction, and thus the points $P^2$ $P^3$ respectively are moved into contact with the front film T, which they slightly stab or prick, and the movement of the arms $P^4$ $P^5$ continuing in the same direction—i. e., in the opposite direction to the arrow $y$—thereby the points $P^2$ $P^3$ approach toward one another, and having the edge of the front film T impaled on said points this said edge is doubled upon itself—i. e, bulged out or caused to assume the curved form shown in Fig. 5—at the middle part of its bottom edge. At this moment the tongue M has now arrived close to the bottom of the pack and still traveling upward said tongue enters between this bulged part of the front film T and the rest of the pack, and immediately this has taken place the form of the camway $O^2$ (by the sharp curve shown thereon) now oscillates the cam-plates O O' in the same direction as arrow $y$ and thereby withdraws the stabbing devices $P^2$ and $P^3$ quickly out of the front film T and these points $P^2$ $P^3$ will retire to their normal position, (see Fig. 4,) the projecting ends of the cross-bar J' now coming out of the camway $O^2$ and clear of same for the rest of the upward travel of the said carriage. As the points $P^2$ $P^3$ are thus withdrawn and the film T released from same, the tongue M threads its way for its full width between the front film and the rest of the pack and continuing to advance upwardly pushes back the rest of the pack (the spring E allowing this) until on the said carriage arriving at the highermost position it has then entirely separated the rest of the pack U (bearing only along the side edge of the latter by means of the side strips Z' Z') from the front film T, the upper edge of which now falls back under the projecting lip $M^2$ and the side edges of the film lie in their original position against the rabbets G and the whole film perfectly flat in front of the carriage, which thus forms a perfectly light-tight backing for same, and this front film resting against the rabbet G down each side is then in correct focal position—i. e., up to register—and the exposure of this front film can now be given without the possibility of any light reaching the rest of the pack in the chamber C or the film in the chamber X where same are deposited after exposure.

It will be obvious that as photographic films are about as stiff as thin cardboard, and laid perfectly flat in the packages, they will stand perfectly flat against the rabbet G without other support than the cross-bars J of the carriage.

When it is desired to remove the front film the draw-levers K are by the knob L drawn outward. Thereby the carriage is drawn down from the position last described into the position shown in Figs. 1, 2 and 4, the lips $M^2$ engaging the top edge of the front film, which is thus held in said carriage and thereby bringing same out of the exposing-chamber with and in said carriage until said carriage is passed clear of the reservoir C, whereupon the rest of the pack is pressed forward by the spring E against the rabbets G G and the next front film of said pack is separated, as before described, on the return movement of the carriage being caused by the levers K, and so on. As the carriage carrying the film moves downward the upper edge of the film will be under the bent-over lip $M^2$ a little below the upper part or bent-over tongue M. The movement of the stabbing devices P and P' caused by the downward movement of the lath J' will take place just as the top of the film passes below the points of the said stabbing devices and before the tongue M has released the pack of films, so that no damage to the films will result from the movement of these stabbing devices as the carriage is withdrawn. Meantime the film thus brought down in said carriage is stripped therefrom on the return (upward) movement of said carriage by any suitable spring or other pawls or catches, such as Y, (see Figs. 2 and 3,) fixed to the frame B, which interpose across the top edge of the exposed film T', lying in such carriage in the position shown in Fig. 2, so as to prevent such film returning with such carriage, and the film thus stripped out of the carriage drops into the chamber X formed to receive same in the bottom of the camera, suitable holding devices, such as the side plate W, being advantageously mounted in the latter chamber to prevent injury to the exposed film while in said chamber X, as before described.

It will be obvious that the form of the stabbing devices P P' may be varied, and also it will be obvious that the necessary movement may be imparted thereto in any other suitable or equivalent manner instead of the particular form of oscillating side lever O, as shown in the drawings.

Instead of the flexible strips Z' any other suitable ridge or raised surface may be arranged down each side of the back of the carriage, so that such carriage as it is inserted between the front film and the rest of the pack only comes in contact with the latter down the extreme side edges of the sensitive surface on the first film of the rest of the pack U immediately next to the carriage, and thereby prevents scratching or injury to said films as the carriage moves up and down.

We claim—

1. In a magazine-camera, the combination with a light-tight chamber to contain a pack of films, of an opaque back adapted to slide into and out of the said chamber, and means operated by the movement of the said sliding back to cause the middle part of one edge of the front film to project across the path of travel of the said sliding back and allow the said back to pass between the front film and the rest of the pack, and protect the latter from light during exposure, and means attached to the sliding back for removing the front film with the said sliding back, substantially as described.

2. In a magazine-camera, the combination with a chamber for holding a pack of films, of a guideway down each side of the front of, and in approximately the same plane with, the front film of said pack, an opaque back adapted to slide reciprocally in or on said guideways, film-stabbing devices operated by the movement of said slide and adapted to engage the edge of the front film and force said edge away from the rest of the pack, and bulge same out across the path of travel of said slide, and means to operate said slide from the exterior of the camera, substantially in the manner and for the purposes described.

3. In a magazine-camera, the combination with a chamber for holding a pack of films, and having a rabbet or shoulder down each side of the front of said chamber against which the pack of films is pressed, a spring-actuated guideway down each side of, and in approximately the same plane as the said rabbets in said chamber, a sliding opaque back adapted to travel in or on and be guided by said guideways, and film-stabbing devices arranged to stab the edge of the front film at distant points, and then continue to move toward one another with the film impaled on the points of said stabbing devices to thus bulge the said edge of the film to permit the insertion of the said sliding opaque back, substantially in the manner and for the purposes described.

4. In a magazine-camera, the combination with a chamber for holding a pack of films and having a rabbet or shoulder down each side of the front of said chamber against which the pack of films is pressed, a spring-actuated guideway down each side of and in approximately the same plane as the said rabbets in said chamber, a sliding light-tight back adapted to travel in or on and be guided by said guideways, and film-stabbing devices arranged to stab the edge of the front film at distant points, and then continue to move toward one another with the film impaled on the points of said stabbing devices to thus bulge the said edge of the film to permit the insertion of the said sliding opaque back, and means to operate said stabbing devices by the movement of the said sliding back, substantially in the manner and for the purposes described.

5. In a film-changing camera, the combination with a sliding opaque back, of two crank-levers such as P, P', mounted in front of the pack of unseparated films, and adapted to be oscillated by the movement of said sliding back, points $P^2$, $P^3$, on said levers adapted to stab the front film near its edge and bulge out said edge and hold same until nose M of said sliding back has entered between said bulged part and the rest of the pack, whereupon the movement of these points is reversed to stretch the said edge of the front film and set it free, and a projection or projections such as $M^2$, on the sliding back to bring said front film out of the exposing-chamber, substantially as and for the purposes described.

6. In a film-changing camera, the combination with a sliding opaque back, of two crank-levers such as P, P', mounted in front of the pack of unseparated films, and adapted to be oscillated by the movement of said sliding back, points $P^2$, $P^3$, on said levers adapted to stab the front film near its edge and bulge out said edge and hold same until the nose M, of said sliding back has entered between said bulged part and the rest of the pack, whereupon the movement of these points is reversed to stretch the said edge of the front film and set it free, and side levers such as O, O', provided with curved slots or camways $O^2$, in which latter operates one of the cross-bars J' of the sliding back to impart the aforesaid reciprocating movement to the stabbing devices, substantially as and for the purposes described.

7. In a film-changing camera, the combination with a sliding opaque back, of two crank-levers such as P, P', mounted in front of the pack of unseparated films, and adapted to be oscillated by the movement of said sliding back, points $P^2$, $P^3$, on said levers adapted to stab the front film near its edge and bulge out said edge and hold same until the nose M, of said sliding back has entered between said bulged part and the rest of the pack, whereupon the movement of these points is reversed to stretch the said edge of the front film and set it free, side levers such as O, O', provided with curved slots or camways $O^2$, in which latter operates one of the cross-bars J', of the sliding back to impart the aforesaid reciprocating movement to the stabbing devices, and a hinged flap such as N, to prevent light passing to the store-chamber X, with the side flanges such as $N^2$ thereon, which flap N, is pressed back by the sliding back as same is moved out of or into the exposing-chamber, substantially as and for the purposes described.

8. In a film-changing camera, the combination with a sliding light-tight back, of two crank-levers such as P, P', mounted in front of the pack of unseparated films, and adapted to be oscillated by the movement of said sliding back, points $P^2$, $P^3$, to said levers adapted to stab the front film near its edge and bulge out said edge and hold same until the nose M, of said sliding back has entered between said bulged part and the rest of the pack, whereupon the movement of these points is reversed to stretch the said edge of the front film and set it free, side levers such as O, O', provided with curved slots or camways $O^2$, in which latter operates one of the cross-bars J', of the sliding back to impart the aforesaid reciprocating movement to the stabbing devices, a hinged flap such as N, to prevent light passing to the store-chamber X, with side flanges such as $N^2$, thereon, by which latter flanges said flap N, is pressed back by the sliding back as same is moved out of, or into, the exposing-chamber, and a nose such as Y, at each side of the frame to strip the drawn-down film $T'$, out of the sliding back as the latter returns into the exposing-chamber, substantially as and for the purposes described.

HENRY HILL.
        ARTHUR LEWIS ADAMS.

Witnesses:
    HENRY BIRKBECK,
    H. MITCHELL.